(12) United States Patent
Emerson, Jr.

(10) Patent No.: US 6,708,361 B1
(45) Date of Patent: Mar. 23, 2004

(54) CONTAINER RAMP

(76) Inventor: William P. Emerson, Jr., 1900 S. Live Oak Pkwy., Wilmington, NC (US) 28403

( * ) Notice: Subject to any disclaimer, the term of this patent is extended or adjusted under 35 U.S.C. 154(b) by 0 days.

(21) Appl. No.: 10/390,274

(22) Filed: Mar. 17, 2003

(51) Int. Cl.⁷ .................................................. E01D 1/00
(52) U.S. Cl. ...................................................... 14/69.5
(58) Field of Search .............................. 14/69.5; 404/25, 404/26; 296/61

(56) References Cited

U.S. PATENT DOCUMENTS

| | | |
|---|---|---|
| 2,452,289 A | 10/1948 | Bryson |
| 2,461,678 A | 2/1949 | Christensen |
| 2,547,956 A | 4/1951 | McDonald |
| 2,659,914 A | 11/1953 | Law |
| 3,061,125 A | 10/1962 | Noland |
| 3,153,798 A * | 10/1964 | Drevitson .................... 14/69.5 |
| 3,487,489 A * | 1/1970 | Kuhns ......................... 14/69.5 |
| 3,818,528 A * | 6/1974 | Petersen ...................... 14/69.5 |
| 3,882,796 A * | 5/1975 | Adreini et al. ........... 108/57.29 |
| 4,075,729 A | 2/1978 | Conner |
| 4,078,678 A * | 3/1978 | Tordella ....................... 414/537 |
| 4,209,869 A | 7/1980 | Trine et al. |
| 4,368,553 A * | 1/1983 | Perry .......................... 14/69.5 |
| 4,375,265 A * | 3/1983 | van de Wetering et al. . 220/1.5 |
| 4,453,282 A * | 6/1984 | Larsen ......................... 14/71.1 |
| 4,634,145 A | 1/1987 | Humpe |
| 5,007,352 A * | 4/1991 | Calkoen ..................... 108/56.1 |
| 5,170,896 A * | 12/1992 | Konstant ..................... 211/151 |
| 5,184,366 A * | 2/1993 | Rawdon et al. .............. 14/71.5 |
| 5,341,533 A * | 8/1994 | Seitz ........................... 14/69.5 |
| 5,417,167 A * | 5/1995 | Sadr ......................... 108/57.19 |
| 5,483,715 A * | 1/1996 | Fogarty et al. ............... 14/69.5 |
| 5,505,140 A * | 4/1996 | Wittmann ................. 108/51.11 |
| 5,517,708 A * | 5/1996 | Baranowski .................. 14/69.5 |
| 5,671,496 A * | 9/1997 | Smith .......................... 14/69.5 |
| 5,815,870 A * | 10/1998 | Deutch et al. ............... 14/69.5 |
| 5,845,356 A | 12/1998 | Kielinski |
| 5,901,395 A * | 5/1999 | Vander Heiden et al. .... 14/69.5 |
| 5,911,179 A * | 6/1999 | Spiczka .................... 108/51.11 |
| 6,240,854 B1 * | 6/2001 | Heil ......................... 108/51.11 |
| 6,263,806 B1 * | 7/2001 | Heil .......................... 108/53.3 |
| 6,349,656 B1 * | 2/2002 | Mitchell .................. 108/57.13 |
| 6,357,366 B1 * | 3/2002 | Frankenberg ............ 108/57.25 |
| 6,428,069 B1 * | 8/2002 | Simonson, Jr. ............. 294/82.1 |

FOREIGN PATENT DOCUMENTS

WO         WO 94/05878     *  3/1994  .......... E04G/27/00

* cited by examiner

*Primary Examiner*—Gary S. Hartmann
*Assistant Examiner*—Kristine Florio
(74) *Attorney, Agent, or Firm*—MacCord Mason PLLC

(57) ABSTRACT

The present invention is a ramp having a front end that can be positioned up to the open end of a shipping container. The ramp has a back end adapted to receive the forks of a forklift for lifting and transport. Generally, the ramp is made up of an upwardly inclined support structure having an upper surface and a lower surface. A load-bearing plate having an outer surface, an inner surface, a front edge and a back edge is attached by its inner surface to the support structure's upper surface. The back edge of the load-bearing plate includes at least one cutout section with a forward edge spaced above the support structure lower surface. At least one lift plate extends downwardly from the load-bearing inner surface. The at least one lift plate has a bottom surface that is substantially in a plane with the at least one cutout forward edge when the ramp is positioned horizontally.

20 Claims, 2 Drawing Sheets

CONTAINER RAMP

BACKGROUND OF THE INVENTION

1. Field of the Invention

The present invention relates generally to ramps used to load and unload freight from shipping containers. In particular, the invention relates to a portable container ramp that can be transported by a forklift.

2. Description of the Prior Art

Container ramps are used to load and unload items to and from shipping containers like those carried by container ships. Shipping containers are often lifted from ships and placed on the dock or ground for loading and unloading. While on the ground, a difference in level exists between the floor of the shipping container and the surface on which it rests. Container ramps are used to bridge this difference in level. These ramps need to be portable for transport from one container to another. Forklift tractors are the vehicles of choice for transporting container ramps between shipping containers.

One of the challenges to transporting a container ramp is the difficulty in initially getting the forks of a forklift under the rear edge of a ramp, which normally rests in full contact with a supporting surface. Prior art attempts to solve this problem mostly involve a rear edge lifting mechanism having moving parts. The moving parts for these lifting mechanisms add substantially to the costs of the ramp and also require more maintenance than ramps not having moving parts.

Other ramps have attached chains that loop over the forks of a forklift for lifting and transporting. Lift chains have the disadvantage of requiring a helper to ready the chains and loop them over the forks of the forklift for lifting and transport. Worst yet, if a helper is not available, a forklift operator must dismount the forklift to ready the chains, thereby breaking up what should be a continuous operation.

One patent, U.S. Pat. No. 4,634,145 to Humped discloses a ramp that does not require a lifting mechanism or lift chains. Instead, the ramp disclosed by Humped has an internal lift engagement support plate structure that receives the forks of a forklift. One disadvantage of this design is the need for a forklift operator to use great precision to guide the forklift forks through openings in the ramp in order to reach the internal lift support plate structure. Another disadvantage is the complexity of manufacture involving the alignment of the internal support plate structure with the slot openings in the ramp. Therefore, a need remains for a container ramp of simple construction that can be easily transported by a forklift tractor.

SUMMARY OF THE INVENTION

The present invention is directed to a portable container ramp capable of supporting loads of considerable weight while bridging the difference in level between the floor of a shipping container and the surface on which the ramp rests. The invention relates especially to a container ramp that can be easily lifted and transported by an elevator type forklift tractor.

The present invention is a ramp having a front end that can be positioned up to the open end of a shipping container and a back end adapted to receive the forks of a forklift for lifting and transport. Generally, the ramp is made up of an upwardly inclined support structure having an upper surface that supports a load bearing plate and a lower surface that normally rests on the ground. The load bearing plate has an outer surface, an inner surface, a front edge, a back edge and side edges. The back edge includes at least one cutout section with a forward edge spaced above the support structure's lower surface. The ramp further includes at least one lift plate that has a bottom surface that is substantially in a plane with the at least one cutout forward edge when the ramp is positioned horizontally, i.e., on the ground.

In a preferred embodiment, there are two spaced cutouts in the back edge of the load-bearing surface. Each of these two cutouts is sized to engage and guide a forklift fork. The spacing between the cutouts is set to receive the forks of a forklift adapted to a given separation distance. Preferably, the front edges of both cutouts are aligned and are parallel with the back edge of the load-bearing surface. Moreover, the forward edge of each cutout can be beveled on a downward slope to help guide the forklift's forks to underneath the ramp. The bevel slope can range between 5 and 45 degrees. The preferred bevel slope is around 20 degrees.

Furthermore, in this preferred embodiment, sidewalls each having a railing section and a support section attach to the side edges of the load-bearing plate. A forward bracing plate near the ramp front end extends downwardly from the load-bearing plate inner surface and extends between and transverse to the sidewalls. Preferably, the upwardly inclined support structure is made up of a plurality of bracing plates extending downwardly from the load-bearing plate's inner surface. The bracing plates and sidewall support sections have bottom edges forming the support structure's lower surface.

Also, two lift plates extend downwardly between two pairs of the bracing plates. Both lift plates have a bottom surface that is substantially in a plane with the forward edges of the two cutouts when the ramp is positioned horizontally, i.e., resting on the ground. The spacing of the lift plates substantially equals that of the spacing of the two cutouts. Moreover, the cutouts and lift plates align defining a pathway that leads engaging forklift forks from the back end of the ramp to the front end of the ramp.

The preferred ramp also includes a forward section comprising a lip for extending over the floor of a shipping container. The lip comprises a horizontal lower surface with a forward edge that extends from the front end of the ramp. An upper surface for the lip is made from a section of the load-bearing surface that extends beyond the front end of the ramp and inclines slightly downward such that the load-bearing surface front edge joins with the horizontal surface's forward edge. Preferably, the lip upper surface inclines downwardly at an angle of around 10 degrees. It is also preferred that the load-bearing surface has a texture to prevent slipping while loading or unloading a shipping container. The texture can be any texture that makes for a non-slip surface. An example would be a texture like that found on the surface of a type of steel plate commonly known as diamond plate.

To lift the ramp, a forklift operator drives the fork tips of a forklift tractor under both cutout forward edges. As the forklift tractor is driven forward, the edges of the cutouts guide the forklift's forks underneath the lift plates. Normally, the forklift operator continues driving the forklift forward until the tips of the forks extend slightly beyond ramp front end. At this point the forklift's forks can be raised to lift the ramp. When lifted, the weight of the ramp is distributed across the forklift's fork at the cutout forward edges, lift plates, and forward bracing plate.

Once lifted, the ramp can be carried on the forklift's forks to a shipping container to be loaded or unloaded. Since the front end of the ramp is facing away from the forklift tractor when carried, the ramp front end can be maneuvered just up to the open end of a shipping container. When the ramp is lowered, the support surface will come to rest on the ground and the ramp lip will extend into the shipping container. Ideally, the lip lower surface will come to rest on the floor of the container. However, slight differences in level may allow a small gap to exist between the lip's lower surface and the container floor. Once the ramp is resting horizontally on the ground, the forklift tractor is backed away and the forklift forks withdraw from beneath the cutout leading edges.

These and other aspects of the present invention will become apparent to those skilled in the art after a reading of the following description of the preferred embodiment.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
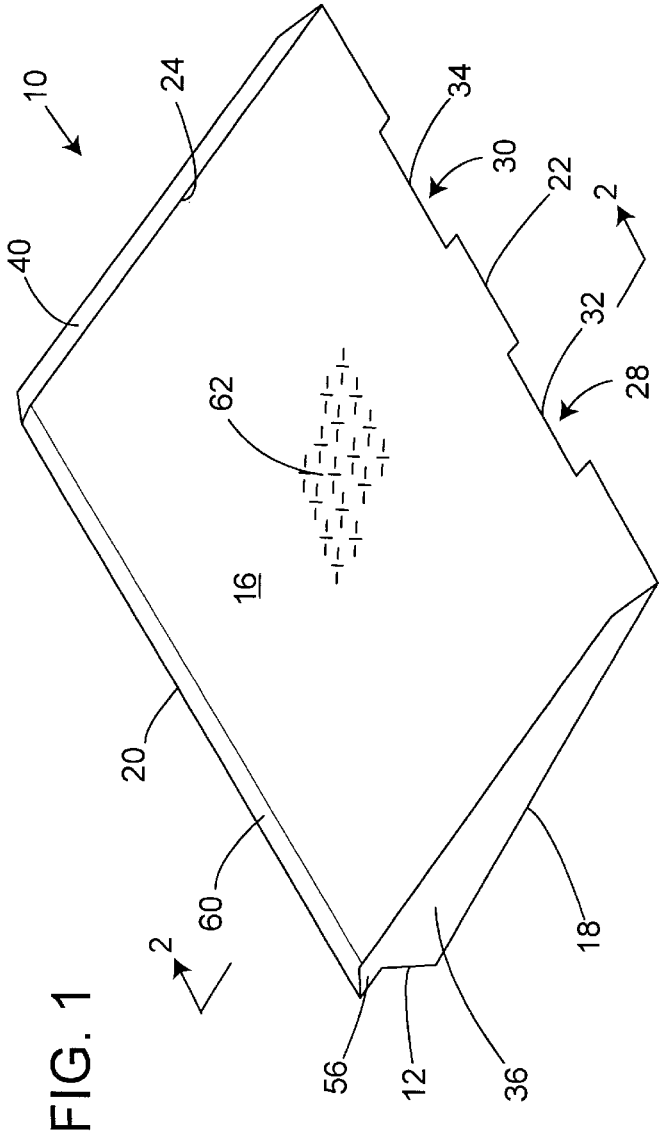
FIG. 1 is a perspective view of the ramp as seen from above showing the load-bearing surface.
Figure 2:
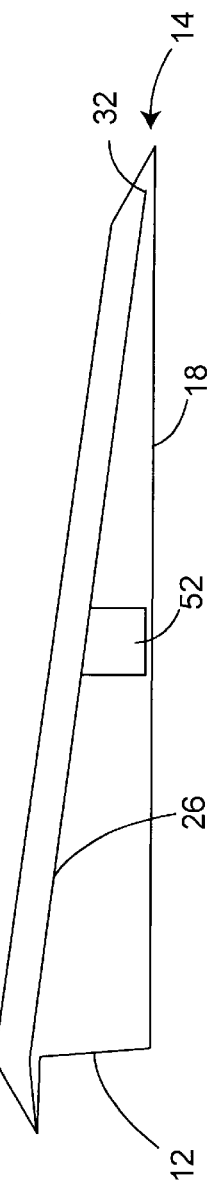
FIG. 2 is a cross sectional view of the ramp showing the positional relationship between the at least one lift plate and the at least one cutout.
Figure 3:
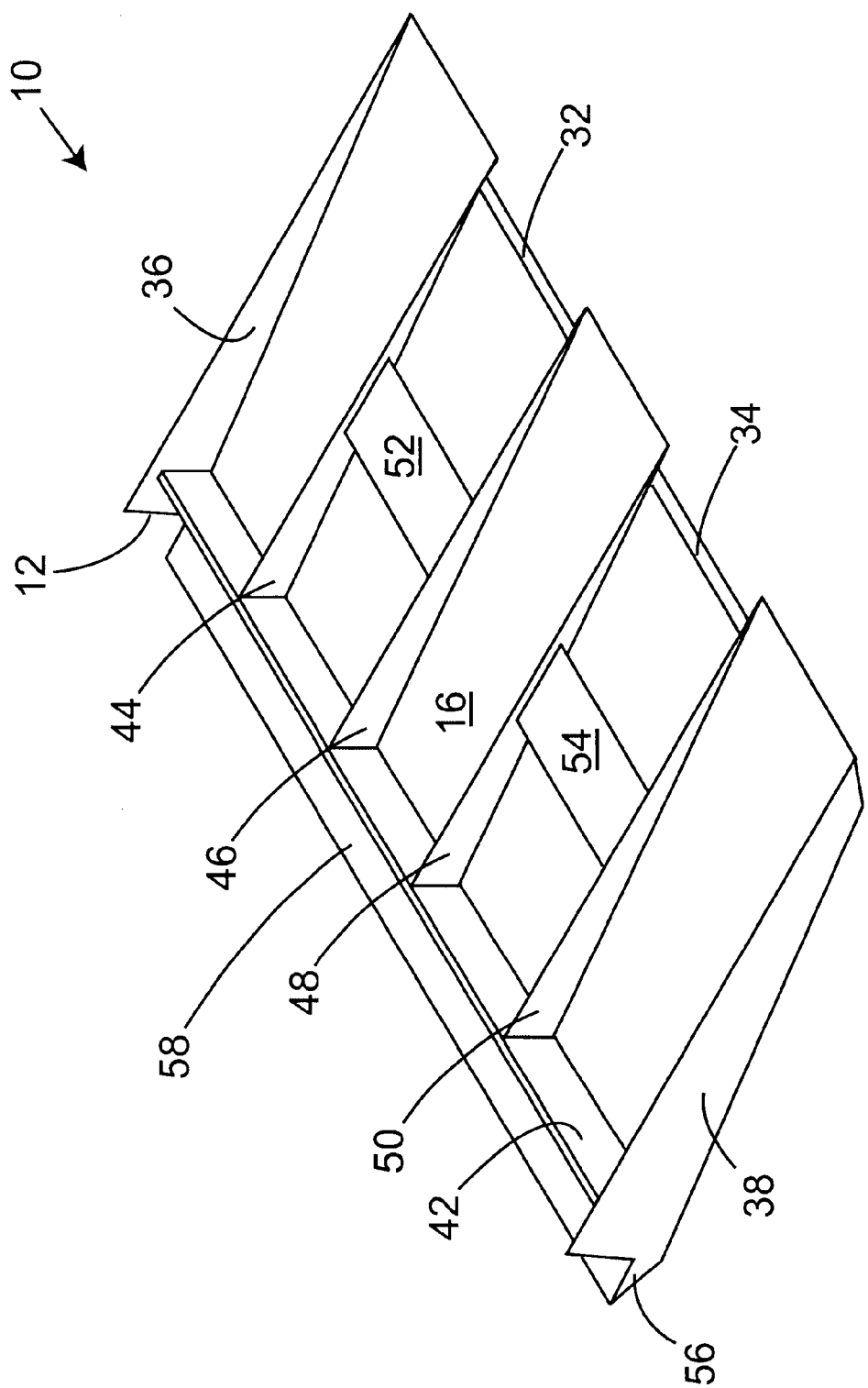
FIG. 3 is a perspective view of the ramp's underside showing the lift plates and plurality of bracing plates.

Referring to FIGS. 1–3, a typical ramp 10 comprises a front end 12 that can be positioned up to the open end of a shipping container (not shown). Ramp 10, has a back end 14 adapted to receive the forks of a forklift for lifting and transport. Generally, ramp 10 is made up of a load bearing plate 16 and a support structure 18. Load-bearing plate 16 has a front edge 20, a back edge 22, a side edge 24 and a side edge 26. Load-bearing surface 16 is supported in an upwardly inclined position by support structure 18. Preferably, ramp 10 is made of aluminum or steel components, but could be made of any material with strength to carry the loads anticipated and weather any expected environmental conditions.

In accordance with the present invention, ramp 10 includes two cutout sections 28 and 30, having forward edges 32 and 34 spaced above the lower surface of support structure 18. Sidewalls 36 and 38 each have a railing section 40 and a support section having a bottom edge forming the lower surface of support structure 18. Sidewalls 36 and 38 attach to load bearing plate edges 24 and 26 along a plane that separates each railing section and each support section.

FIG. 3 shows ramp 10 turned upside down. When right side up, a forward bracing plate 42 near ramp front end 12, extends downwardly from the inner surface of load-bearing plate 16, and extends between and transverse to sidewalls 36 and 38. Ramp 10 further includes equidistantly spaced bracing plates 44, 46, 48 and 50 that extend downwardly from the inner surface of load-bearing plate 16 and rearwardly from forward bracing plate 42.

As best seen in FIGS. 2 and 3, a lift plate 52 extends downwardly from the inner surface of load-bearing plate 16 and extends between ramp bracing plates 44 and 46. Another lift plate 54 extends downwardly from load-bearing surface 16 and extends between ramp bracing plates 48 and 50. As best seen in FIG. 2, lift plates 52 and 54 each have a bottom surface substantially in a plane with cutout forward edges 32 and 34, when ramp 10 is positioned horizontally, i.e., resting on the ground.

As best seen in FIGS. 1 and 3, ramp 10 also includes a forward section comprising a lip 56 for extending over the floor of a shipping container (not shown). Lip 56 has horizontal lower surface 58 and an upper surface 60 that inclines downwardly to join at front edge 20. Lip 56 extends from ramp front end 12. Preferably load-bearing surface 16 has a texture 62 to prevent slipping.

To lift ramp 10, a forklift operator drives the fork tips of a forklift tractor (not shown) under cutout forward edges 32 and 34. As the forklift tractor is driven forward, cutouts 32 and 34 guide the forklift's forks underneath lift plates 52 and 54. Preferably, the forklift operator continues driving the forklift forward until the tips of the forks extend slightly beyond ramp front end 12. At this point the forklift's forks can be raised lifting ramp 10. When lifted, the weight of ramp 10 is distributed across the forklift's fork at cutout leading edges 32 and 34, lift plates 52 and 54, and forward bracing plate 42.

Once lifted, ramp 10 can be carried on the forklift's forks to a shipping container to be loaded or unloaded. Since ramp front end 12 is facing away from the forklift tractor when carried, ramp front end 12 can be placed just up to the open end of a shipping container. When ramp 10 is lowered, support surface 18 will come to rest on the ground and lip 56 will extend into the shipping container. Ideally, lip lower surface 58 will come to rest on the floor of the container, however slight differences in level may allow a small gap to exist between lower surface 58 and the container floor. Once ramp 10 is resting horizontally on the ground, the forklift tractor is backed away and the forklift forks withdraw from beneath cutout leading edges 32 and 34.

Certain modifications and improvements will occur to those skilled in the art upon a reading of the foregoing description. It should be understood that all such modifications and improvements have been deleted for the sake of conciseness and readability but are properly within the scope of the following claims.

What is claimed is:

1. A portable container ramp comprising:
   a) an upwardly inclined support structure having an upper suds and a lower surface, wherein said upper surface is upwardly inclined when said lower surface is horizontal;
   b) a load-bearing plate having an outer surface, an inner surface, a front edge and a back edge, said back edge including at least one cutout section with a forward edge spaced above said support structure lower surface, said load-bearing plate inner surface being attached to said support structure upper surface; and
   c) at least one lift plate extending downwardly from said load-bearing plate inner surface, wherein said at least one lift plate has a bottom surface substantially in a plane with said at least one cutout forward edge when said ramp is positioned horizontally.

2. The ramp of claim 1, wherein said upwardly inclined support structure is a plurality of bracing plates extending downwardly from said load-bearing plate inner surface, each of said plates having a lower edge forming said support structure lower surface.

3. The ramp of claim 2, wherein a said lift plate extends downwardly between two of said plurality of bracing plates.

4. The ramp of claim 1, further including sidewalls having a lower edge forming said support structure lower surface.

5. The ramp of claim 4, wherein each of said sidewalls further includes a railing section that extends above said load-bearing plate upper surface.

6. The ramp of claim 1, further including a lip with a substantially horizontal lower surface and a downwardly inclined upper surface, said lip extending from the front edge of said load-bearing plate.

7. The ramp of claim 6, wherein the downward incline of said upper surface is approximately 10 degrees.

8. The ramp of claim 1, further including two spaced cutouts in said load-bearing sure back edge, wherein each of said cutouts have aligned front edges parallel to said load bearing plate back edge.

9. The ramp of claim 8, wherein said cutouts are spaced to receive forklift forks spaced at a given separation.

10. The ramp of claim 1, wherein said support structure is upwardly inclined from between a range of 5 to 45 degrees.

11. The ramp of claim 1, wherein said cutout forward edge is beveled downwardly from between a range of 5 to 45 degrees.

12. A portable container ram comprising:
  a) a plurality of upwardly inclined equidistly spaced bracing plates having upper edges forming a support structure upper surface and lower edges forming a support structure lower surface, wherein said upper surface is upwardly inclined when said lower surface is horizontal;
  b) a load-bearing plate having an outer surface, an inner surface, a front edge and a back edge, said back edge including at least one cutout section with a forward edge spaced above said support structure lower surface, said load-bearing plate inner surface being attached to said support structure upper surface; and
  c) at least one lift plate extending downwardly from load-bearing plate inner surface, wherein said at least one lift plate has a bottom surface substantially in a plane with said at least one cutout forward edge when said ramp is positioned horizontally.

13. The ramp of claim 12, wherein said at least one cutout section is sized to engage the fork of a forklift.

14. The ramp of claim 12, wherein the load-bearing surface is textured to prevent slipping.

15. The ramp of claim 12, wherein said upwardly inclined support structure is made of steel.

16. A portable container ramp comprising:
  a) a plurality of upwardly inclined equidistantly spaced bracing plates having upper edges forming a support structure upper surface and lower edges forming a support structure lower surface, wherein said upper surface is upwardly inclined when said lower surface is horizontal;
  b) a load-bearing plate having an outer surface, an inner surface, a front edge and a back edge, said back edge including two cutout sections with forward edges spaced above said support structure lower surface, said load-bearing plate inner surface being attached to said support structure upper surface;
  c) sidewalls attached to said side edges of said load-bearing plate;
  d) a forward bracing plate extending downwardly from said inner surface of said load-bearing plate in front of said bracing plates and extending between and transverse to said sidewalls; and
  e) a pair of lift plates extending downwardly from said load-bearing plate inner surface between two pairs of said bracing plates, wherein said two lift plates have bottom surfaces substantially in a plane with said two cutout forward edges when said ramp is positioned horizontally.

17. The ramp of claim 16, when lifted by forklift forks has its weight distributed across the forklift's forks at said cutout leading edges, said lift plates and said forward bracing plate.

18. The ramp of claim 16, wherein said load-bearing plate upper surface has a diamond plate texture.

19. The ramp of claim 16, wherein said each of said cutout forward edges is beveled downwardly at around 20 degrees.

20. The ramp of claim 16, further including sidewalls attached to said sidewall edges, each of said sidewalls having a railing section extending above said load-bearing plate side edges.

* * * * *